United States Patent
Inui

(10) Patent No.: US 9,013,751 B2
(45) Date of Patent: Apr. 21, 2015

(54) PRINTING APPARATUS, METHOD, AND STORAGE MEDIUM FOR CHANGING A SHEET ATTRIBUTE SET TO A SHEET HOLDING UNIT

(71) Applicant: Canon Kabushiki Kaisha, Tokyo (JP)

(72) Inventor: Masanobu Inui, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/685,508

(22) Filed: Nov. 26, 2012

(65) Prior Publication Data

US 2013/0135638 A1    May 30, 2013

(30) Foreign Application Priority Data

Nov. 28, 2011 (JP) ................. 2011-259224

(51) Int. Cl.
*H04N 1/60* (2006.01)
*G06K 15/02* (2006.01)
*G06K 15/00* (2006.01)

(52) U.S. Cl.
CPC .............. *G06K 15/02* (2013.01); *G06K 15/002* (2013.01); *G06K 15/1809* (2013.01); *G06K 15/4065* (2013.01)

(58) Field of Classification Search
None
See application file for complete search history.

(56) References Cited

U.S. PATENT DOCUMENTS

| | | | |
|---|---|---|---|
| 6,762,856 B2 * | 7/2004 | Farrell et al. | 358/1.8 |
| 7,728,992 B2 * | 6/2010 | Yamamoto et al. | 358/1.13 |
| 8,662,493 B2 * | 3/2014 | Yano | 271/9.01 |
| 2005/0104272 A1 * | 5/2005 | Watanabe et al. | 271/9.05 |
| 2009/0261524 A1 * | 10/2009 | Nakayama et al. | 271/3.14 |
| 2012/0075646 A1 * | 3/2012 | Koike | 358/1.9 |
| 2012/0263511 A1 * | 10/2012 | Fukuda | 399/405 |
| 2013/0058663 A1 * | 3/2013 | Yano | 399/16 |
| 2013/0077109 A1 * | 3/2013 | Wakana | 358/1.12 |
| 2013/0099440 A1 * | 4/2013 | Hikichi | 271/9.06 |
| 2014/0140749 A1 * | 5/2014 | Harano | 400/582 |

FOREIGN PATENT DOCUMENTS

JP     2009-256076 A    11/2009

\* cited by examiner

*Primary Examiner* — Dung Tran
(74) *Attorney, Agent, or Firm* — Canon USA Inc. IP Division

(57) ABSTRACT

A system in which when a setting of a certain sheet storing unit of a group of sheet storing units is changed, and the changed setting of the certain sheet storing unit is different from settings of other sheet storing units within the same group as the certain sheet storing unit, a user is notified accordingly, or the changed setting is set to the other sheet storing units.

8 Claims, 19 Drawing Sheets

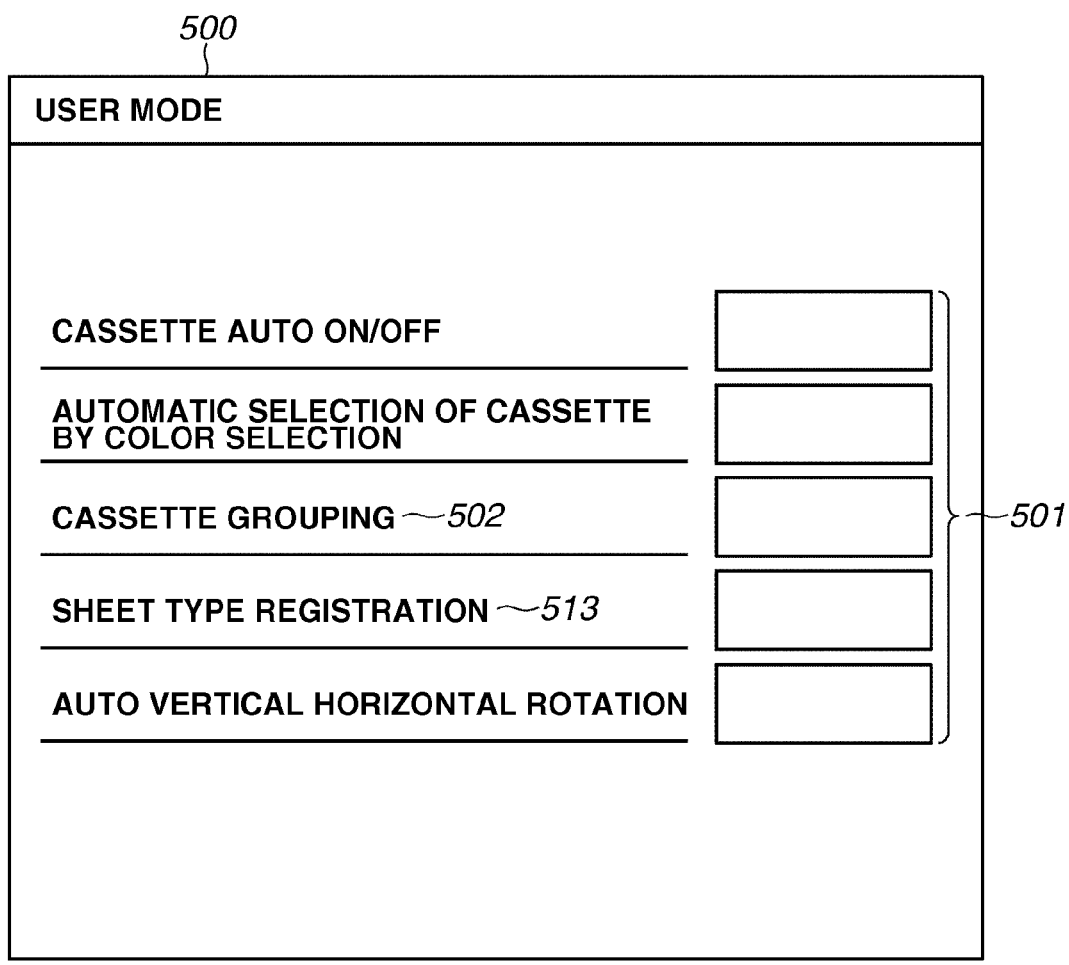

FIG.5F

SHEET REGISTRATION: SHEET TYPE SELECTION

| THIN PAPER 1 (64~79 g/m²) | PLAIN PAPER (80~105 g/m²) | THICK PAPER 1 (106~128 g/m²) | THICK PAPER 2 (129~150 g/m²) |
|---|---|---|---|
| THICK PAPER 3 (151~180 g/m²) | THICK PAPER 4 (181~209 g/m²) | THICK PAPER 5 (210~256 g/m²) | THICK PAPER 6 (257~300 g/m²) |
| ONE-SIDED COATED PAPER 1 (80~105 g/m²) | ONE-SIDED COATED PAPER 2 (106~128 g/m²) | ONE-SIDED COATED PAPER 3 (129~150 g/m²) | ONE-SIDED COATED PAPER 4 (151~180 g/m²) |
| ONE-SIDED COATED PAPER 5 (181~209 g/m²) | ONE-SIDED COATED PAPER 6 (210~256 g/m²) | TWO-SIDED COATED PAPER 1 (80~105 g/m²) | TWO-SIDED COATED PAPER 2 (106~128 g/m²) |
| TWO-SIDED COATED PAPER 3 (129~150 g/m²) | TWO-SIDED COATED PAPER 4 (151~180 g/m²) | TWO-SIDED COATED PAPER 5 (181~209 g/m²) | TWO-SIDED COATED PAPER 6 (210~256 g/m²) |

CANCEL  ◄ BACK  OK ↵

SYSTEM STATE/STOP ►

FIG.6A

| CASSETTE | APPLICATION OF GROUPING | GROUP NAME | SIZE | TYPE |
|---|---|---|---|---|
| CASSETTE 1 | OFF | GROUP 1 | A4 | PLAIN PAPER |
| CASSETTE 2 | ON | GROUP 1 | A4 | PLAIN PAPER |
| CASSETTE 3 | ON | GROUP 2 | A4 | PLAIN PAPER |
| CASSETTE 4 | ON | GROUP 1 | A3 | PLAIN PAPER |
| CASSETTE 5 | ON | GROUP 1 | A4 | PLAIN PAPER |
| CASSETTE 6 | ON | GROUP 2 | A4 | THICK PAPER |
| CASSETTE 7 | OFF | GROUP 1 | A4 | THICK PAPER |
| CASSETTE 8 | OFF | GROUP 1 | A4 | THICK PAPER |

FIG.6B

| | STATE |
|---|---|
| USE GROUP | ON |

FIG.9

| ATTRIBUTE ID (801) | TYPE ID (802) | VALUE (803) | MEANING (804) |
|---|---|---|---|
| 10 | 1 | OPTIONAL CHARACTER STRING | JOB NAME |
| 11 | 1 | OPTIONAL CHARACTER STRING | APPLICATION NAME |
| 100 | 2 | 1, 2, 3, 4, 5 | CASSETTE STAGE |
| 101 | 2 | 1, 2, 3, 4 | SHEET DISCHARGE STAGE |
| 104 | 2 | 3 | NUMBER OF COPIES |

| | | | |
|---|---|---|---|
| 401 | 11 | 0~7015, 0~9920 | IMAGE SIZE |
| 402 | 11 | 0~7015, 0~9920 | MOVEMENT AMOUNT |
| 403 | 2 | 1, 2, 3 | TWO-SIDED |
| 404 | 2 | 1, 2, 3, 4 | BINDING LOCATION |

PRINTING APPARATUS, METHOD, AND STORAGE MEDIUM FOR CHANGING A SHEET ATTRIBUTE SET TO A SHEET HOLDING UNIT

BACKGROUND OF THE INVENTION

1. Field of the Invention

The claimed invention generally relates to printing and, more particularly, to a printing system, a control method for the printing system, and a storage medium.

2. Description of the Related Art

A related-art printing system has a function of defining some sheet storing units as one group among a plurality of sheet storing units.

This function causes a sheet storing unit to be switched within the group when running out of sheets in the sheet storing unit is detected during execution of a print job received from an information processing apparatus.

Moreover, Japanese Patent Application Laid-Open No. 2009-256076 discusses a technique in which if a sheet storing unit, among sheet storing units defined as one group, stores a sheet having a different sheet size or type, this sheet storing unit is excluded from the group while another sheet storing unit is newly included in the group.

In such a printing system, the same size and the same type of sheets can be set in the grouped sheet storing units to efficiently switch the sheet storing unit.

Herein, assume that a user changes size or type of a sheet set in a certain sheet storing unit among a grouped plurality of sheet storing units. In this case, the user needs to change sheets and sheet size or type setting set for the other sheet storing units belonging to the same group as the certain sheet storing unit. However, there are cases where the user forgets to change the sheets or the settings. In a printing system considering only a group name without considering size and type of sheets at the time of switching a sheet storing unit to be used, a print result cannot be provided on a desired size and type of sheets. Moreover, in a printing system considering size and type of sheets at the time of switching a sheet storing unit to be used, the number of usable sheet storing units can be decreased due to a decrease in the number of sheet storing units storing the same size and the same type of sheets within the group.

SUMMARY OF THE INVENTION

According to an aspect of the claimed invention, a printing apparatus for printing an image on a sheet conveyed from any of a plurality of sheet storing units storing sheets, the printing apparatus includes a storing unit configured to store attribute information of the sheets of the plurality of sheet storing units, a registering unit configured to register two or more sheet storing units as a group among the plurality of sheet storing units, a printing unit configured, when an amount of sheets set in a certain sheet storing unit included in the two or more sheet storing units registered as the group by the registering unit is less than or equal to a predetermined amount while printing is being executed using the certain sheet storing unit, to continue printing by changing a sheet conveyance source to another sheet storing unit included in the two or more sheet storing units registered as the group, a changing unit configured, when sheet attribute information changed by the changing unit for the certain sheet storing unit is different from attribute information of sheets of other sheet storing units belonging to the same group as the certain sheet storing unit, to change attribute information of a sheet of any sheet storing unit among the plurality of sheet storing units, and a notification unit configured to notify a user.

Further features and aspects of the claimed invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the claimed invention and, together with the description, serve to explain the principles of the claimed invention.

FIGS. 5A, 5B, 5C, 5D, 5E, and 5F are diagrams illustrating examples of user interface (UI) screens displayed on a liquid crystal display unit illustrated in FIG. 4.

FIGS. 6A and 6B are diagrams each illustrating a management table used to manage sheet cassettes to be grouped.

FIG. 9 is a table illustrating a structure of attribute ID illustrated in FIG. 8.

DESCRIPTION OF THE EMBODIMENTS

Various exemplary embodiments, features, and aspects of the claimed invention will be described in detail below with reference to the drawings.

Figure 1:
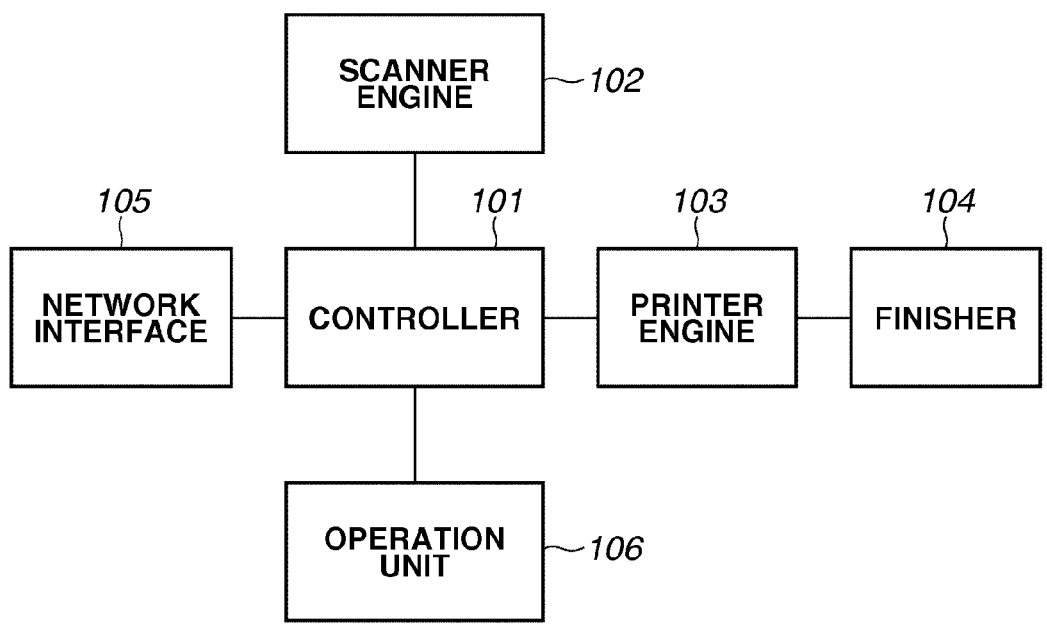
FIG. 1 is a block diagram illustrating a configuration of a printing system.

A first exemplary embodiment will be described. FIG. 1 is a block diagram illustrating a configuration of a printing system according to an exemplary embodiment of the claimed invention. The printing system of the present exemplary embodiment is configured with a multi-functional peripheral (MFP). The printing system includes a plurality of sheet cassettes functioning as sheet storing units. Herein, the sheet cassette includes a paper deck to feed a large amount of sheets. In the present exemplary embodiment, the printing system includes a finisher. However, the present exemplary embodiment may be applied to a printing apparatus including a plurality of sheet cassettes without including a finisher.

In FIG. 1, a controller 101 integrally controls the MFP. The controller 101 will be described in detail with reference to FIG. 2 below. A scanner engine 102 controls a scanner that reads an original document and generates image data. The scanner engine 102 is controlled by the controller 101. A printer engine 103 feeds a sheet from a sheet storing unit, and prints an image on the sheet. The printer engine 103 is controlled by the controller 101.

The printer engine 103 is connected to a finisher engine 104 for performing post-processing on a sheet. The finisher engine 104 can perform stapling processing on a plurality of sheets in a bundle output from the printer engine 103. The post-processing performed by the finisher engine 104 is controlled by the controller 101.

A network interface 105 controls communication performed via network by the MFP. The MFP is communicable with an external information processing apparatus, a server device, and other information processing apparatuses via the network interface 105. For example, the MFP receives a print job from an external information processing apparatus through the network interface 105. Herein, sheet cassette information is set in the print job, the sheet cassette information being set by a user using a printer driver of an information processing apparatus. Moreover, the MFP is configured so that various settings can be performed from an external information processing apparatus through the network interface 105. For example, group setting processing for grouping a plurality of sheet cassettes can be set by a user through a user interface (UI) screen provided by a printer driver.

Figure 2:
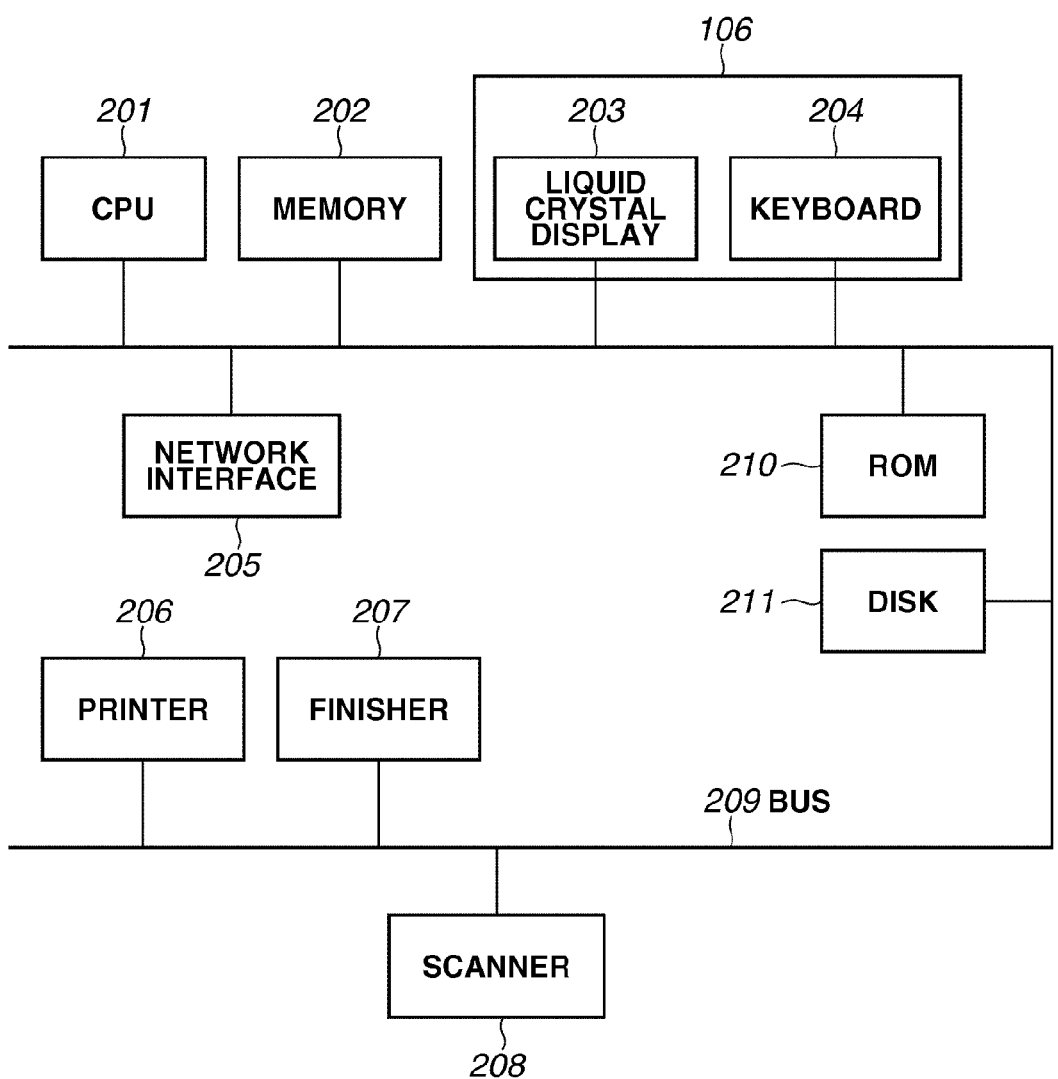
FIG. 2 is a diagram illustrating a hardware configuration of a controller illustrated in FIG. 1.

An operation unit 106 includes a liquid crystal display 203 and a keyboard 204, as shown in FIG. 2. The operation unit 106 displays information from the controller 101. Moreover, the operation unit 106 informs the controller 101 of instruction from a user. On the liquid crystal display 203, a UI screen is displayed by a central processing unit (CPU) so that a user can perform various settings.

FIG. 2 is a diagram illustrating a hardware configuration of the controller 101 illustrated in FIG. 1.

An inside of the controller 101 as illustrated in FIG. 2, a CPU 201 is connected to a memory 202, the liquid crystal display 203 and the keyboard 204 forming the operation unit 106, a read only memory (ROM) 210, and a disk 211 functioning as an external storage medium via a bus 209. Herein, the disk 211 includes a hardware disk drive (HDD) and a flexible disk drive (FDD).

The disk 211 stores various programs and data. These programs and data are sequentially read by the memory 202 and executed by the CPU 201 as necessary. The disk 211 may be detachably attached to the MFP or installed inside the MFP. Moreover, the program may be downloaded from another MFP via network and stored in the disk 211.

The memory 202 is configured with a non-volatile memory such as a static random access memory (SRAM). The liquid crystal display 203 and the keyboard 204 form the operation unit 106 illustrated in FIG. 1.

The CPU 201 causes a UI screen to be displayed by writing data on the liquid crystal display 203. The CPU 201 receives an input of instruction from a user by reading data from the keyboard 204 or the liquid crystal display 203 being a touch panel. The information input from the operation unit 106 is transferred and accumulated in any of the memory 202, the disk 211, and the CPU 201, and is used for various processing.

A network interface 205 is connected to the bus 209. This network interface 205 corresponds to the network interface 105 illustrated in FIG. 1.

Moreover, a printer 206, a finisher 207, and a scanner 208 are connected to the bus 209. The printer 206 is controlled by the printer engine 103, whereas the finisher 207 is controlled by a finisher engine 104. The scanner 208 is controlled by the scanner engine 102.

The printer 206 feeds a sheet from a sheet cassette, and forms an image on the sheet. The finisher 207 performs post-processing with respect to a sheet when the post-processing is set by a user. The scanner 208 reads an image of an original document and generates image data. The generated image data is stored in the disk 211, and may be printed by the printer 206 later, or transmitted through the network interface 205 later.

Figure 3:
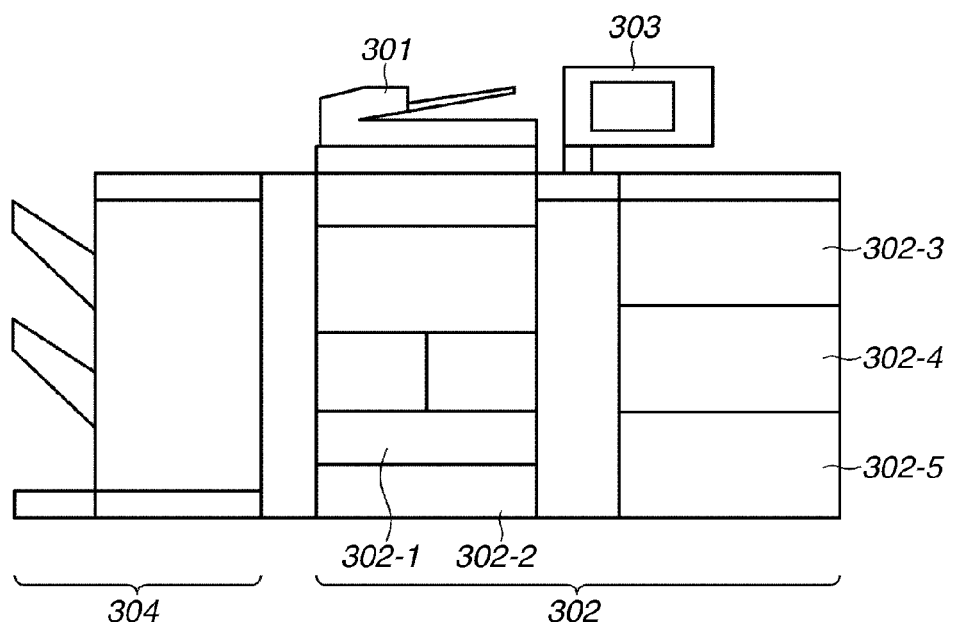
FIG. 3 is an external view illustrating a configuration of the printing system illustrated in FIG. 1.

FIG. 3 is an external view illustrating a configuration of the printing system illustrated in FIG. 1. In FIG. 3, a scanner unit 301 irradiates an image of an original document with light, and scans the image using a charge coupled device (CCD) line sensor, thereby generating electrical image data from the original document placed on a scanner. When the image data is generated, the CPU 201 performs color determination and size determination of the original document based on the electrically converted image data.

A printer unit 302 prints an image on a sheet based on image data. A finisher unit 304, based on an instruction from a user, performs post-processing such as stapling and bookbinding on sheets with images printed by the printer unit 302, and discharges the post-processed sheets. Each of sheet cassettes 302-1 through 302-5 functions as a sheet storing unit for storing sheets to be used for printing, and stores sheets whose size and type are set by a user. Moreover, the CPU 201 determines whether sheets stored in the sheet cassettes 302-1 through 302-5 have run out based on an output of a sheet presence sensor (not illustrated). An operation unit 303 displays a user interface screen illustrated in FIG. 4.

Figure 4:
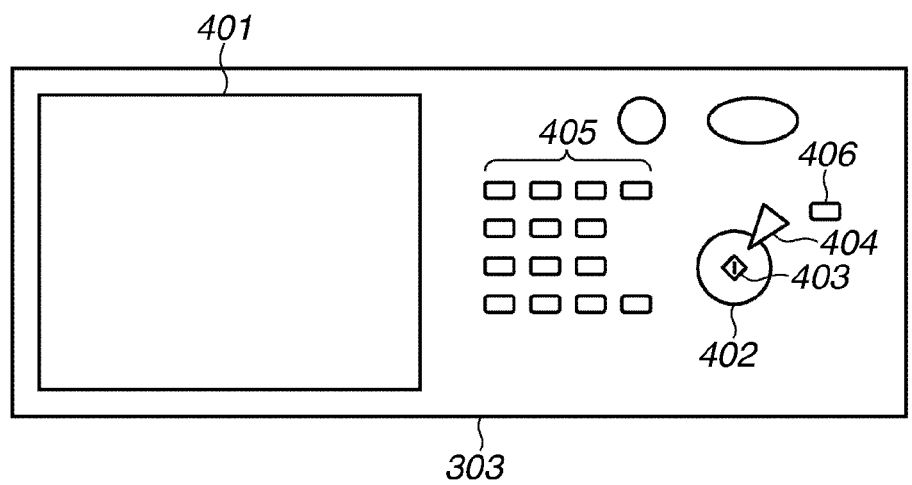
FIG. 4 is a plan view illustrating a configuration of an operation unit illustrated in FIG. 1.

FIG. 4 is a plan view illustrating a configuration of the operation unit 106 illustrated in FIG. 1. In FIG. 4, a liquid crystal display unit (liquid crystal display) 401 displays an operation screen and a screen for notifying a user of status of the MFP. The liquid crystal display unit 401 has a liquid crystal screen on which a touch panel sheet is attached, and displays the operation screen of the MFP. When a displayed key is pressed, the liquid crystal display unit 401 notifies the CPU 201 of position information of the pressed key.

A start key 402 is used when starting a document image reading operation and a print operation, for example. A light emitting diode (LED) 403 having two colors of green and red is provided in the middle of the start key 402. The color of the LED 403 indicates whether the start key 402 is in a usable state. A stop key 404 is used to stop an operation in progress.

A numeric keypad 405 includes a numeric keypad and other keys. The numeric keypad 405 is used to set the number of copies and provide an instruction for switching a screen of the liquid crystal display unit 401. A user mode key 406 is pressed when a device setting is performed.

As described above, the MFP includes a plurality of sheet cassettes. A user sets size and type of sheets for each sheet cassette, so that the CPU 201 can specify which sheet cassette should be used for print execution. Moreover, a plurality of sheet cassettes can be grouped by a user, so that the MFP can continue printing using sheets in another sheet cassette within the same group when the sheet cassette designated by the user has run out of sheets. Accordingly, it is desired that a user set the same size or type of sheets to the sheet cassettes belonging to the same group. The size and type of the sheet designated by the user for each cassette, or information of the group including a plurality of sheet cassettes is managed inside the disk 211 (or the memory 202).

Figure 5B:
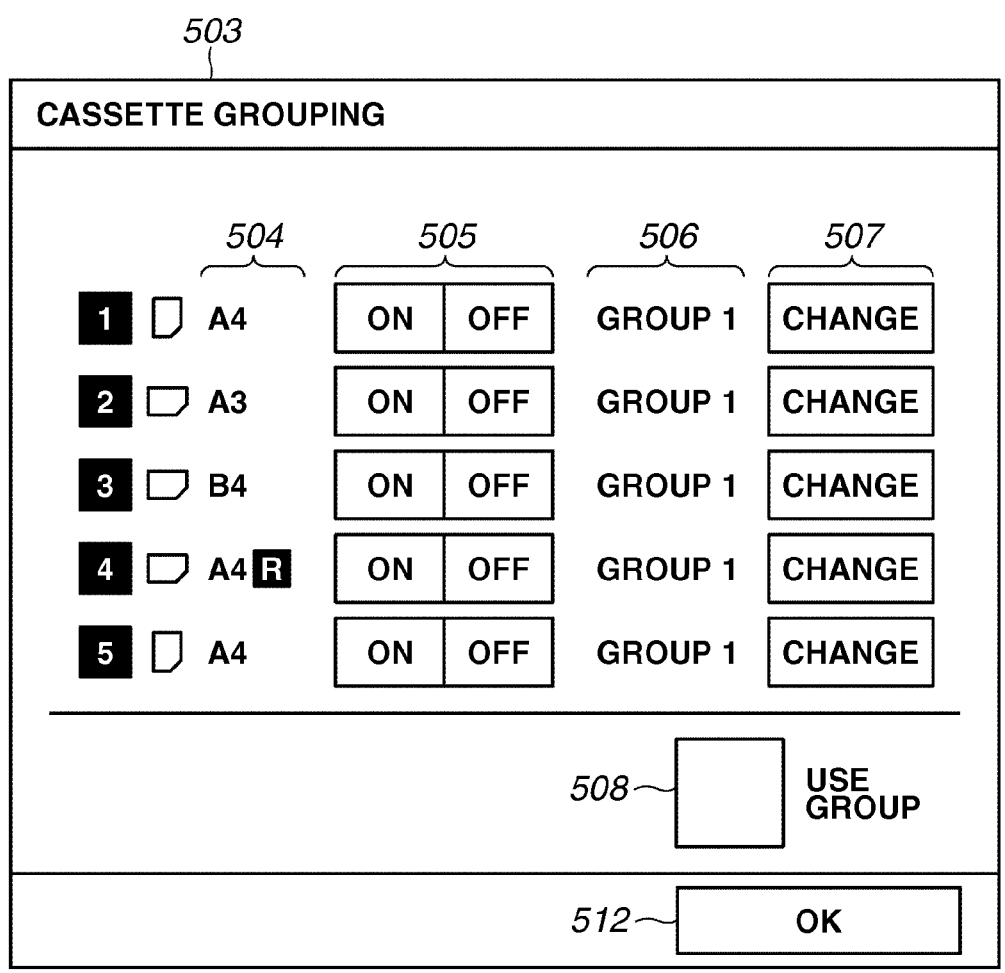

Now, descriptions are given of a cassette group setting and a method for setting sheet size and type for a cassette by a user from a user mode screen. FIGS. 5A to 5F are diagrams illustrating examples of a user interface screen to be displayed on the liquid crystal display unit 401 illustrated in FIG. 4. In FIGS. 5A to 5B, each of screens 500, 503, 508, 514, 518, and 524 is displayed on the liquid crystal display unit 401.

In FIG. 5A, when the user presses the user mode key 406 illustrated in FIG. 4, the user mode screen 500 is displayed on the liquid crystal display unit 401 based on the control by the CPU 201. On the user mode screen 500, the user can perform a device setting. Among a button group 501, a button 502 is used to begin a setting of sheet cassette grouping. When the button 502 is pressed, in FIG. 5B, a UI screen (a cassette grouping screen) 503 is displayed on the liquid crystal display unit 401 based on the control by the CPU 201.

In a sheet cassette display portion 504, size and orientation of sheets stored in sheet cassettes usable by the MFP are displayed on a cassette basis. A button group 505 includes an ON button indicating that a sheet cassette is a grouping target, and an OFF button indicating that a sheet cassette is not a grouping target. The ON and OFF buttons are arranged for each sheet cassette.

Herein, the user presses the ON button if a sheet cassette is to be a grouping target. The user presses the OFF button if a sheet cassette is not to be a grouping target. FIGS. 6A and 6B are diagrams each illustrating a management table used to manage sheet information of sheet cassettes to be grouped in the printing system. In this example table 6A, a sheet cassette group includes eight sheet cassettes. In each of the eight sheet cassettes, the presence or absence of application of grouping, group name, sheet size, and sheet type are managed. FIG. 6A illustrates a management table for each of the sheet cassettes, and FIG. 6B illustrates a table for managing whether to use a group.

These tables can be stored and managed by any of the memory 202 or the disk 211 of the controller 101.

The CPU 201 reflects a pressing state of the button group 505 in the application of grouping item in the table illustrated in FIG. 6A as occasion arises, and stores the pressing state. In a group name display portion 506, a setting content of a group name in the table is displayed. This group name can be changed by pressing a button group 507.

Figure 5C:
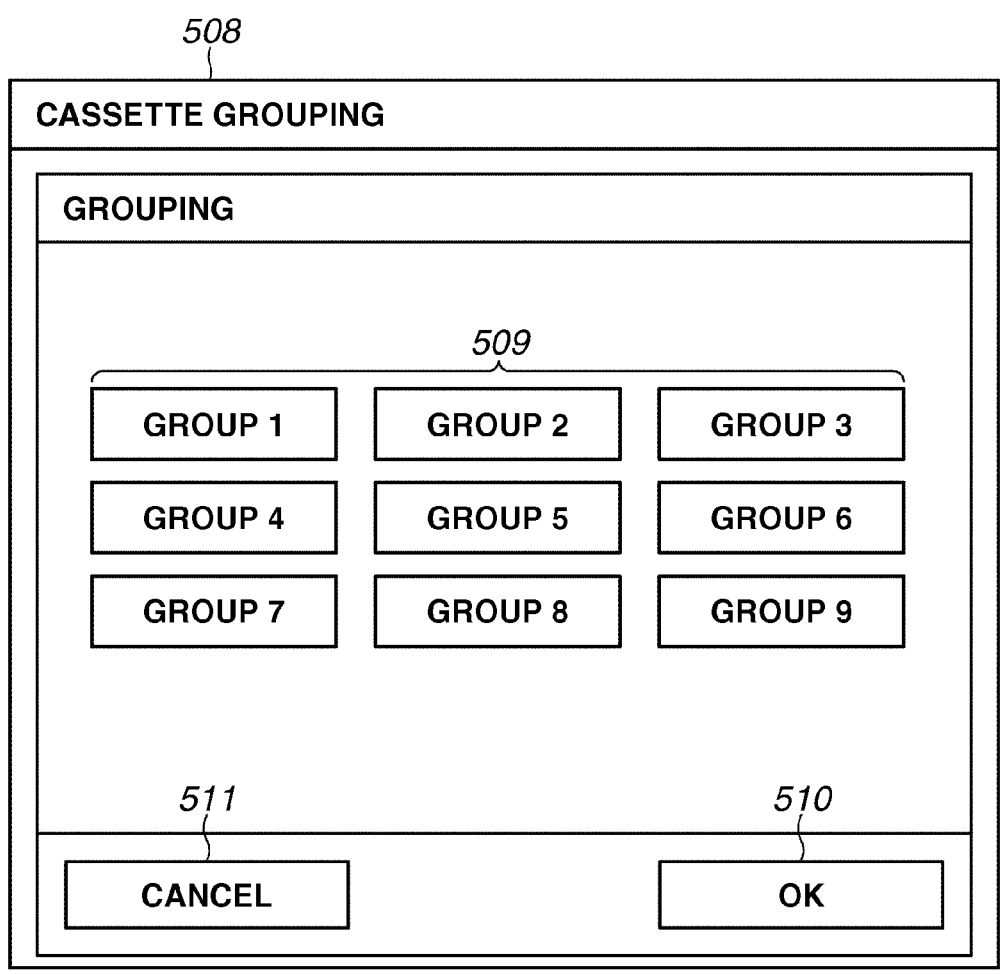

On the UI screen 503, if a user presses any button in the button group 507, the CPU 201 causes a UI screen (a cassette grouping screen) 508 in FIG. 5C to be displayed on the liquid crystal display unit 401.

On the UI screen 508 representing cassette grouping, a button group 509 is arranged, so that a user can select a group name. Herein, if a user presses a button corresponding to an optional group and then presses an OK button 510, the group name item in the table illustrated in FIG. 6A is updated, and a display content on the UI screen returns to that on the UI screen 503 in FIG. 5B based on the control by the CPU 201. If the user does not intend to change the group name, the user presses a cancel button 511.

When the user presses the cancel button 511, the group name item in the table illustrated in FIG. 6A is not updated, and a display content of the UI screen returns to that of the UI screen 503 based on the control by the CPU 201.

On the UI screen 508, each button in the button group 509 for using a group is a toggle switch, and a selection of whether to perform a grouping operation can be made according to the content set on this screen. Specifically, when any button in the button group 509 is pressed once, the pressed button becomes an ON state. When the button is pressed again, the pressed button becomes an OFF state. Such a state is managed by the table illustrated in FIG. 6B. The table illustrated in FIG. 6B can be stored in any of the memory 202 or the disk 211 of the controller 101. That is, a state of the button group 509 for using a group is reflected in the group name item in the table illustrated in FIG. 6B.

The user presses an OK button 512 upon completion of setting on the UI screen 503. When the OK button is pressed, the UI screen returns to the UI screen 500 representing the user mode, and the group setting of the sheet cassettes is completed.

Next, a method for setting a sheet type of a cassette will be described. When a button 513 for sheet type registration is pressed among the button group 501 illustrated in the UI screen 500, the CPU 201 switches a display state of the UI screen to a UI screen 514 for sheet registration in FIG. 5D. The UI screen 514 includes a button group 515 used to designate a sheet cassette whose setting is to be changed. When a setting button 516 is pressed after designation, the CPU 201 causes a UI screen 518 for sheet size setting to be displayed in FIG. 5E.

The UI screen 518 is displayed when the CPU 201 cannot automatically determine size of the sheet set in a sheet cassette. On the other hand, when a content of the sheet cassette can be automatically determined, the CPU 201 switches the UI screen to a UI screen 524 in FIG. 5F.

The button group 519 is arranged on the UI screen 518 for sheet size setting, so that sheet size can be selected. Herein, if a user selects an optional size from the button group 519 and presses a "NEXT" button 523, the CPU 201 updates the size item in the table illustrated in FIG. 6A. If a user intends to return to a previous screen without performing such a setting, the user presses a "BACK" button 521. When the "BACK" button 521 is pressed, the CPU 201 causes the UI screen to return to the UI screen 514.

If a user intends to stop sheet registration without setting, the user presses a cancel button 520.

In the UI screen 524 in FIG. 5F for sheet type selection, a button group 525 is arranged, so that a user can select a sheet type from the button group 525. When the user presses an OK button 528 upon selection of a sheet type, the CPU 201 updates the type item in the table illustrated in FIG. 6A. If the user intends to return to a previous screen without performing the setting, the user presses a "BACK" button 527. When the "BACK" button 527 is pressed, the CPU 201 causes a display of the UI screen to return to the UI screen 518. Moreover, if the user intends to stop sheet registration without setting, the user presses a cancel button 526.

Accordingly, the information indicating size and type of the sheet set in the sheet cassette, and the allocation of each sheet cassette to any of the groups can be determined.

Figure 7:
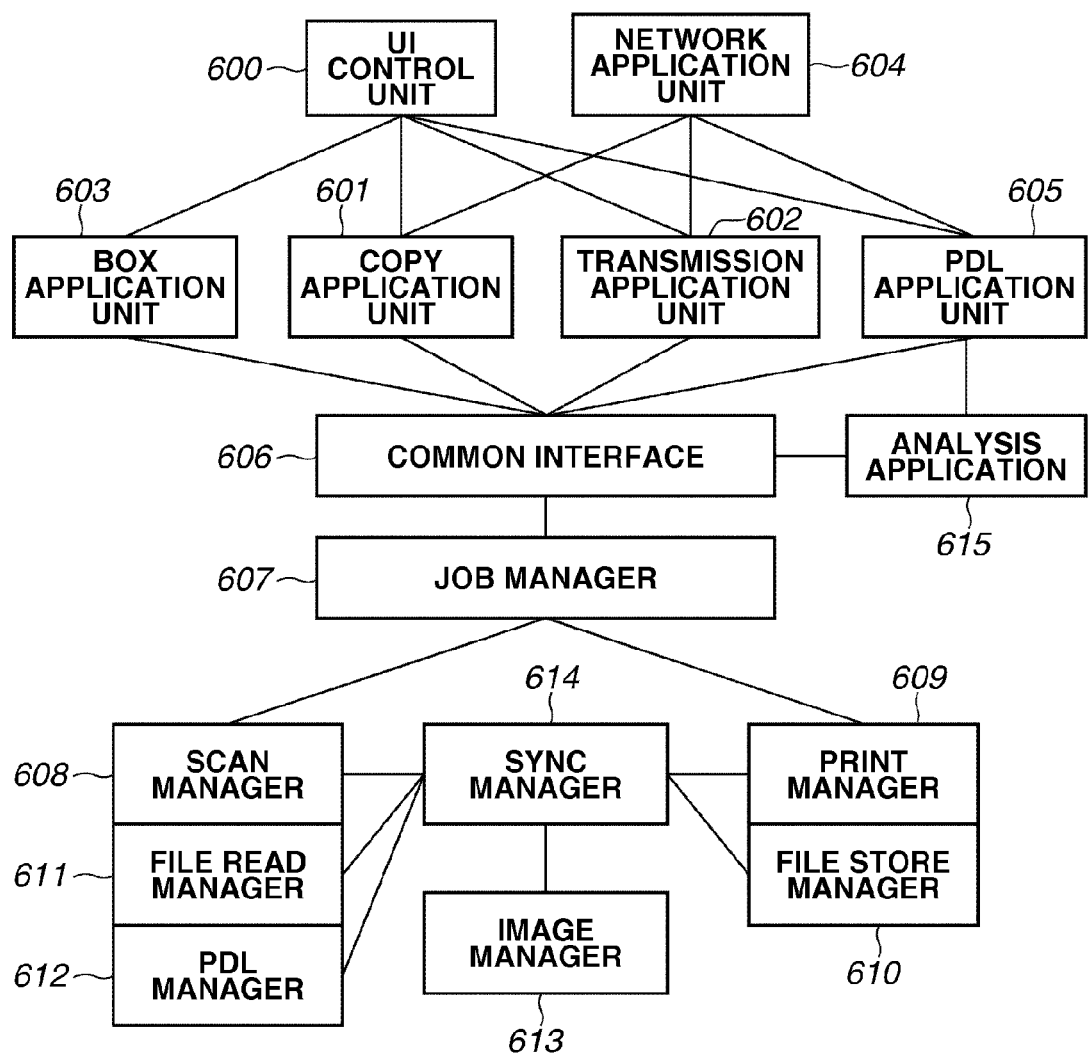
FIG. 7 is a block diagram illustrating a module configuration of the printing system illustrated in FIG. 1.

FIG. 7 is a block diagram illustrating a module configuration of the printing system illustrated in FIG. 1.

In FIG. 7, a UI control unit 600 controls a display of UI screen displayed on the operation unit 106. A copy application unit 601 receives an instruction from the UI control unit 600, and executes a copy operation.

A transmission application unit 602 receives an instruction from the UI control unit 600, and executes a data transmission operation. A box application unit 603 receives an instruction from the UI control unit 600, and executes scanning and printing from a box screen. A page description language (PDL) application unit 605 receives PDL print data from the network application unit 604, and generates a PDL print job.

A common interface 606 absorbs a device-dependent portion of a device control portion. A job manager 607 organizes job information received from the common interface 606, and transmits the information to a document process unit of a lower layer.

In the document process unit, a scan manager 608 and a print manager 609 operate and perform copy processing if requested processing is copying.

Moreover, if requested processing is a transmission job, the scan manager 608 and a file store manager 610 operate and perform processing. If requested processing is a reception job, a file read manager 611 and the print manager 609 operate and perform processing. Moreover, in a case of PDL print such as a laser-beam-printer image processing system (LIPS) and PostScript, a PDL manager 612 and the print manager 609 operate and perform processing. An analysis application 615 analyzes and edits a job file output from the PDL application unit 605, and inputs the job to the common interface 606.

A synchronization (SYNC) manager 614 synchronizes between each of these document managers, and requests an image manager 613, which performs various types of image processing, to perform image processing. The image manager 613 performs image processing and image file storing processing at the time of scanning and printing.

Figure 8:
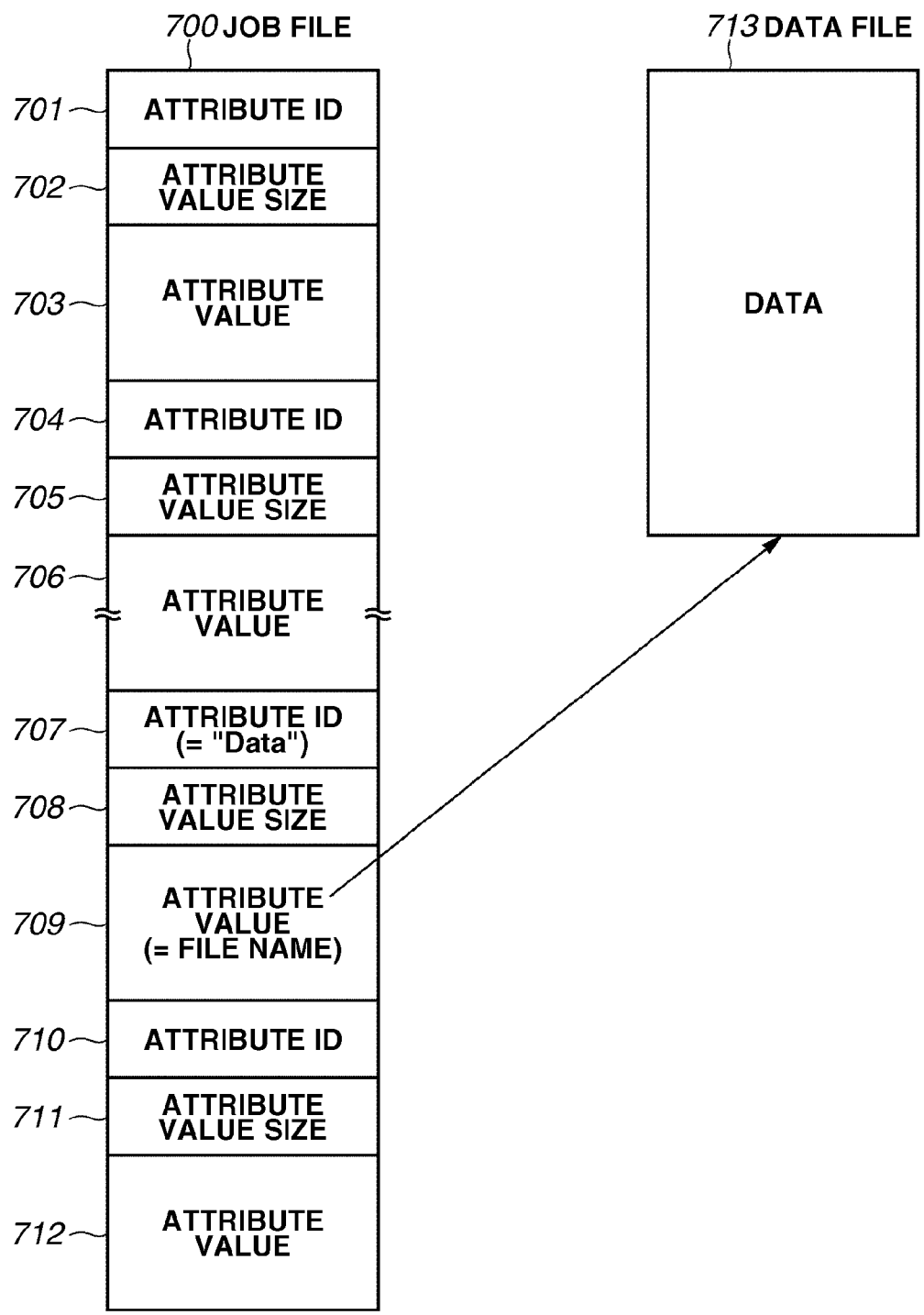
FIG. 8 is a diagram illustrating a structure of a job file processed by the printing system.

FIG. 8 is a diagram illustrating a structure of a job file processed by the printing system according to the present exemplary embodiment. In the present exemplary embodiment, an internal structure of data to be a job entity is described. The data is generated by each of the application units inside the device when a job execution instruction is provided from the UI control unit 600 or the network application unit 604. Herein, the application units include the copy application unit 601, the transmission application unit 602, the box application unit 603, and the PDL application unit 605.

As for a copy job, the copy application unit 601 is notified of a setting input from the operation unit 303, and the job is generated based on the notified information. As for a PDL job, the PDL application unit 605 generates the job based on the information notified from the network application unit 604.

As illustrated in FIG. 8, the job entity is represented by having a plurality of sets of attribute IDs 701, 704, and 710, attribute value sizes 702, 705, and 711, and attribute values 703, 706, and 712 in sequence. When a job includes data, a value representing the data, size of a file, and a file name of a data file 713 retaining document data are retained as the attribute ID 707, an attribute value size 708, and the attribute value 709, respectively. The attribute includes a data format (e.g., PDL in use), the number of copies, a cassette stage, designation of finishing processing.

FIG. 9 is a table illustrating a structure of the attribute ID illustrated in FIG. 8. In FIG. 9, an attribute ID item 801 represents an ID number of an attribute. A type ID item 802 represents a type (size) of an ID, and "1" and "2" are defined as undefined length and 1 byte, respectively. A value item 803 represents an allowable value that has a meaning as provided in a meaning item 804. In addition to this example table, there is a variety of attributes. These values can be set in the attribute ID, the attribute size ID, and the attribute value illustrated in FIG. 8, thereby forming a job.

Figure 10:
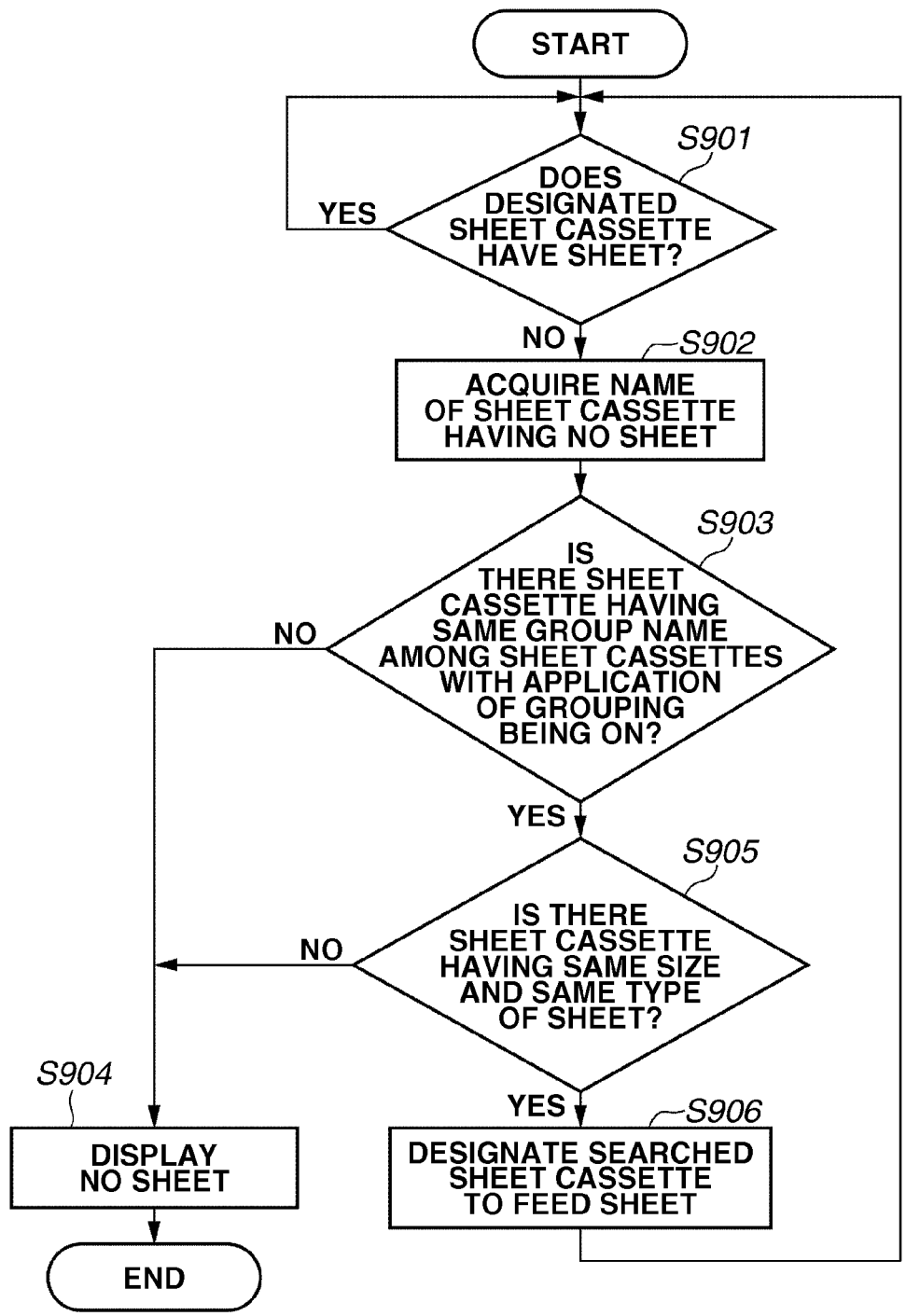
FIG. 10 is a flowchart illustrating a control method for the printing system.

An example of a first feed processing will be described. FIG. 10 is a flowchart illustrating a control method for the printing system according to the present exemplary embodiment. This example corresponds to a processing performed when the absence of sheets occurs in a sheet cassette group designated among a plurality of sheet cassette groups in the printing system. Each step is performed by the CPU 201 executing a control program loaded to the memory 202. Now, a description is given of one example processing where a job in which "100" and "2" indicating a sheet cassette 2 are respectively set in the attribute ID item 801 and the value item 803 illustrated in FIG. 9 is input, and the print job is executed using sheets of the sheet cassette 2. This processing starts upon execution of the print job when the data in the table illustrated in FIG. 6B is ON.

In step S901, the CPU 201 determines whether a sheet is present in the sheet cassette 2 designated by the print job in progress based on an output from a sensor (not illustrated). If the CPU 201 determines that the sheet is absent in the sheet cassette 2 (NO in step S901), then in step S902, the CPU 201 acquires a group name of the sheet cassette 2 having no sheet from the table illustrated in FIG. 6A. In this example processing, since the sheet cassette 2 runs out of sheets, the CPU 201 acquires the group name of "GROUP 1" from the table illustrated in FIG. 6A.

Subsequently, in step S903, the CPU 201 searches and determines whether there is a sheet cassette having the same group name among the sheet cassette group with application of grouping being ON from the table illustrated in FIG. 6A. Herein, if the CPU 201 determines that the sheet cassette having the same group name is not present within the sheet cassette group (NO in step S903), the operation proceeds to step S904. In step S904, the CPU 201 displays a message indicating the absence of sheets on the liquid crystal display unit 401 of the operation unit 303, and then this processing ends.

On the other hand, if the CPU 201 determines that the sheet cassette having the same group name is present among the sheet cassette group (YES in step S903), then in step S905, the CPU 201 determines whether there is a sheet cassette with remaining sheets having the same size and the same type. If the CPU 201 determines that the sheet cassette with remaining sheets having the same size and the same type is not present (NO in step S905), the operation proceeds to step S904. In step S904, the CPU 201 displays a message indicating the absence of sheets on the liquid crystal display unit 401 of the operation unit 303, and then this processing ends.

On the other hand, if the CPU 201 determines that the sheet cassette with the remaining sheets having the same size and same type is present (YES in step S905), the operation proceeds to step S906. In step S906, the CPU 201 continues to print, changing a sheet cassette as a feeding source of sheets to be used for printing to the sheet cassette found in step S905 from the sheet cassette determined as the absence of sheets in step S901. Subsequently, the CPU 201 proceeds to the step S901. Accordingly, in a plurality of sheet cassette groups, auto cassette change (ACC) function processing can be executed within the sheet cassettes set in the same group, and printing can be executed while reducing the possibility of stopping the print operation.

Figure 11:
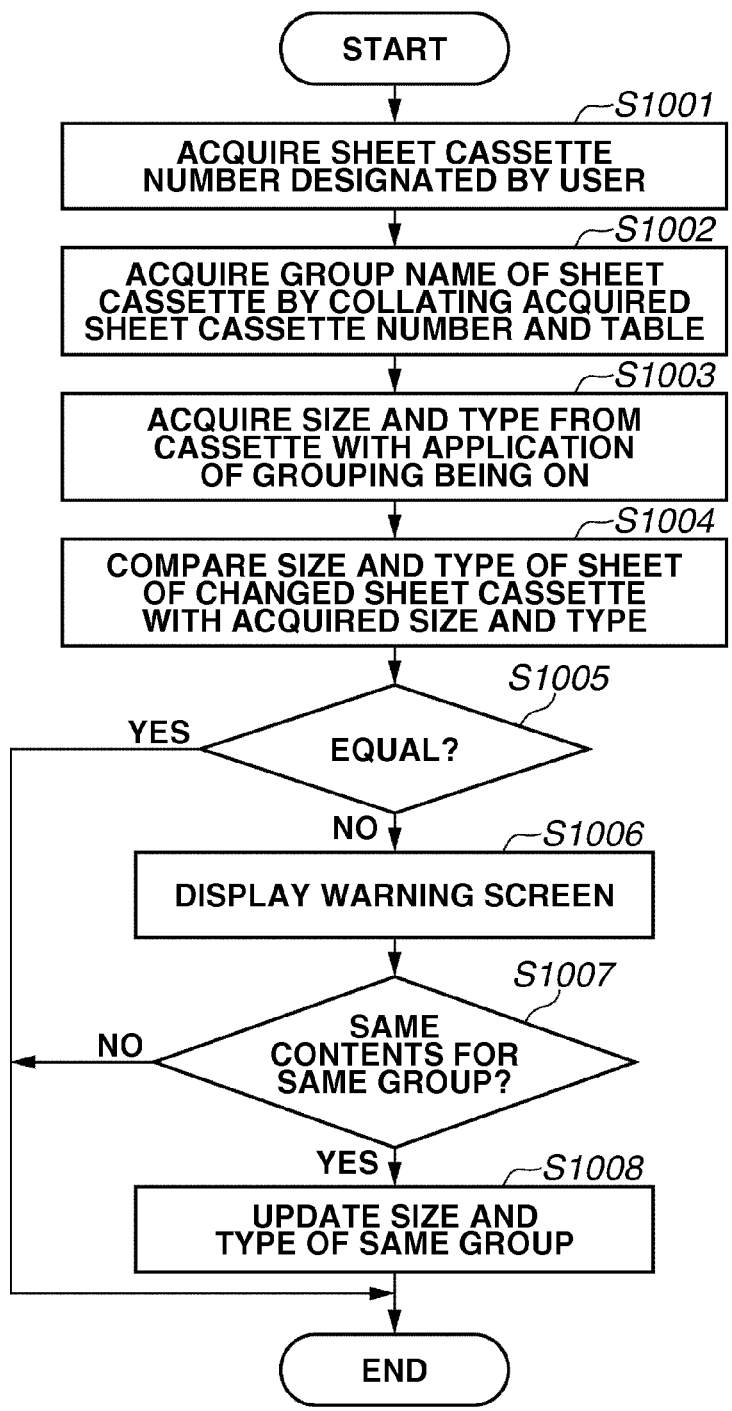
FIG. 11 is a flowchart illustrating a control method for the printing system.

An example of a second feed processing will be described. FIG. 11 is a flowchart illustrating a control method for the printing system according to the present exemplary embodiment. The example of the second feed processing is performed when the absence of sheets occurs in a sheet cassette designated as a group among a plurality of sheet cassette groups in the printing system. The second feed processing corresponds to the processing when the state in the table illustrated in FIG. 6B is set to "ON". Each step is performed by the CPU 201 executing a control program loaded to the memory 202. This example of the second feed processing is executed when the state in the table illustrated in FIG. 6B is set to "ON", and the OK button 528 is pressed upon registration of a sheet from the UI screen 514 illustrated in FIG. 5D.

Figure 5D:
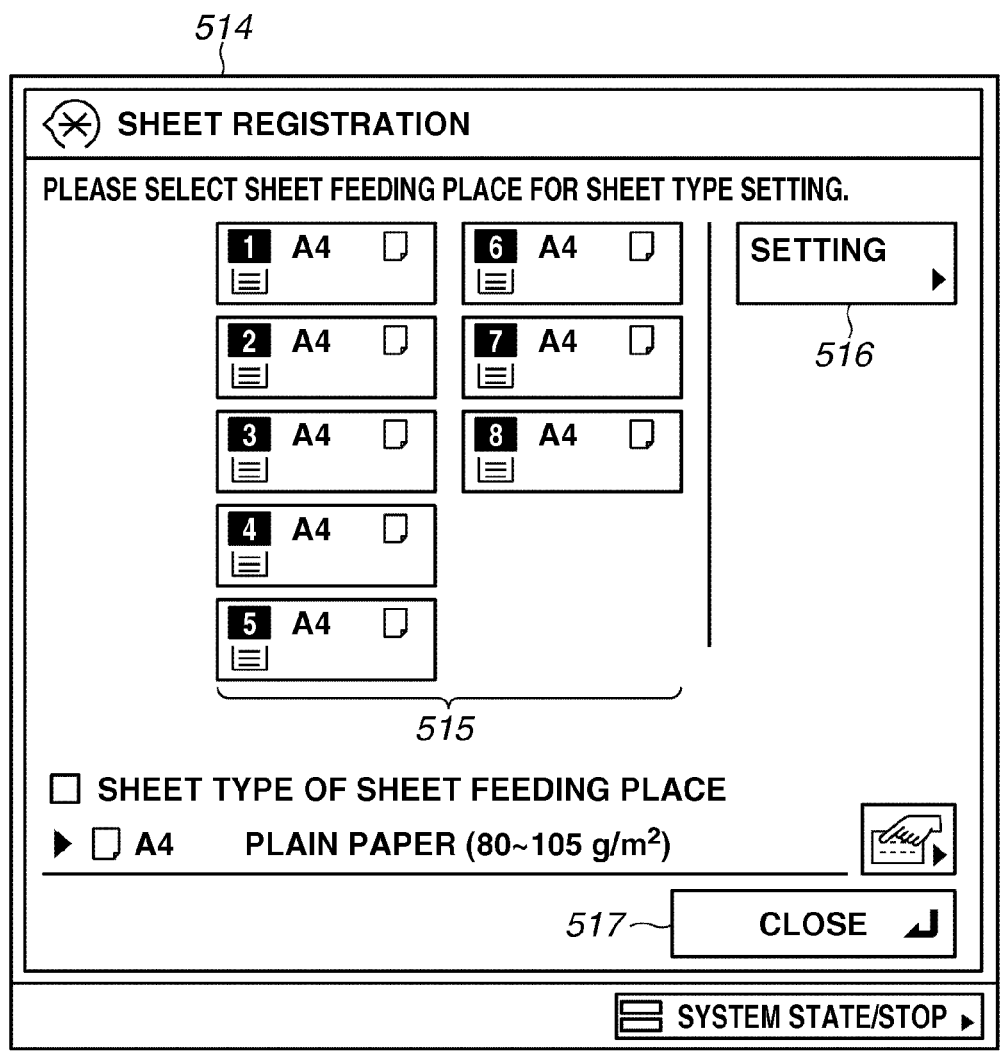
Figure 5E:
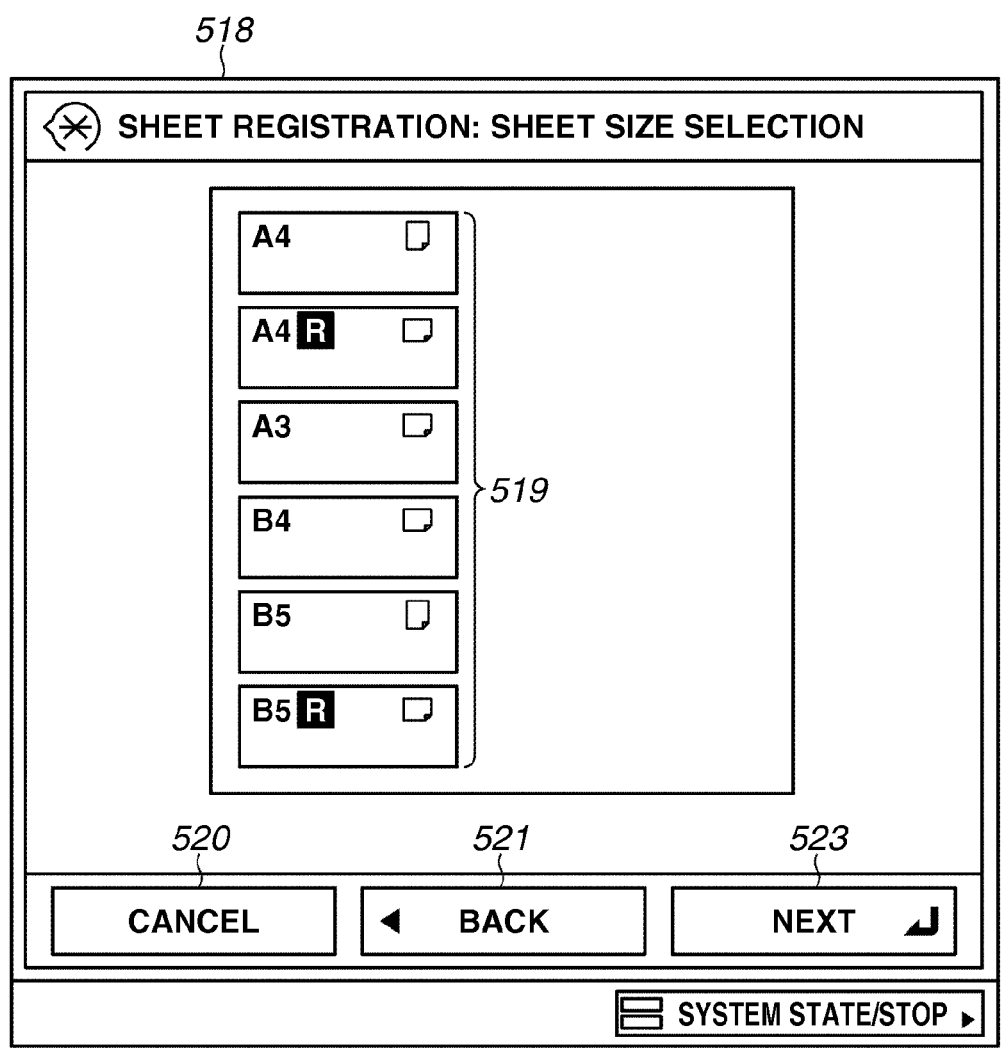

In step S1001, the CPU 201 acquires a sheet cassette number pressed by a user among the button group 515 displayed on the UI screen 514 illustrated in FIG. 5D. Subsequently, in step S1002, the CPU 201 acquires a group name of the sheet cassette by collating the acquired sheet cassette number and the table illustrated in FIG. 6A.

In step S1003, the CPU 201 checks if the application of grouping is ON by referring to the table illustrated in FIG. 6A, and then acquires size and type from other cassettes having the same group name as the sheet cassette designated by the user. Herein, assume that sheet cassettes belonging to the same group store the same size and type of sheets. Accordingly, even if there is a plurality of sheet cassettes having the same group name as the sheet cassette designated by the user, the CPU 201 only necessary to acquire information of size and type from one sheet cassette in step S1003. In step S1004, the CPU 201 compares size and type of the sheet of the sheet cassette changed by the user with the size and type acquired in step S1003. In step S1005, the CPU 201 determines whether the size and type of the sheet of the sheet cassette changed by the user and the size and type acquired in step S1003 are equal. If the CPU 201 determines that the sizes and the types are equal (YES in step S1005), the operation ends.

Figure 12:
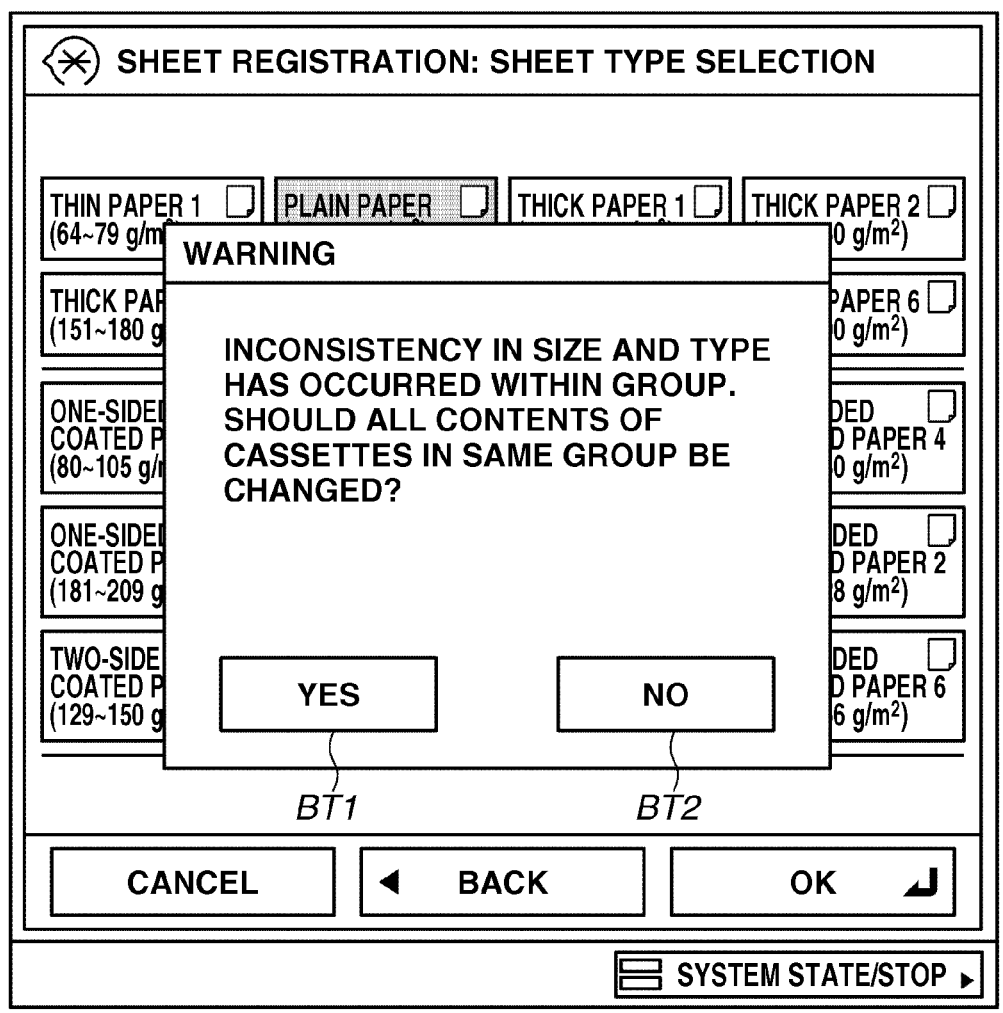
FIG. 12 is a diagram illustrating one example of a UI screen displayed on the liquid crystal display unit illustrated in FIG. 4.

On the other hand, if the CPU 201 determines that the sizes and the types are not equal (NO in step S1005), the CPU 201 proceeds to step S1006. In step S1006, the CPU 201 displays a warning of changes and a message for inquiring of the user whether the changes are to be valid on the operation unit 303 with the UI screen illustrated in FIG. 12. The UI screen illustrated in FIG. 12 is one example of a warning screen displayed when information of the changed sheet and information of the sheets set in other sheet cassettes belonging to the same group as the sheet cassette with the changed sheet are not equal. This warning screen notifies a user of inconsistency of sheet information. Subsequently, in step S1007, the CPU 201 determines whether the user intends to have the same contents (size and type) for all the cassettes in the same group based on whether the user selects any of a BT1 button and a BT2 button on the UI screen illustrated in FIG. 12.

Herein, if the CPU 201 determines that the user has selected the BT1 button corresponding to the same contents for the same group (YES in step S1007), then in step S1008, the CPU 201 updates size and type of the same group to be the same as the size and type of the cassette number determined in step S1001. Then, the processing ends.

On the other hand, if the CPU 201 determines that the user has selected the BT2 button corresponding to not the same contents (NO in step S1007), the operation ends. When the CPU 201 determines that the contents are not the same (NO in step S1007), the CPU 201 may control to remove the changed sheet cassette, based on the information of the changed sheet cassette, from group information of the same group to which the changed sheet cassette belongs. Accordingly, auto cassette change control is appropriately performed by using a plurality of sheet cassettes excluding the removed sheet cassette.

Therefore, when a user changes information of a sheet of any of the sheet cassette, the possibility of a down time occurrence can be reduced by always maintaining appropriate settings of the grouped sheet cassettes. Moreover, the contents of the grouped sheet cassettes can always remain constant, thereby reducing an increase in the number of sheet cassettes that cannot be changed within the grouped sheet cassettes.

Figure 13:
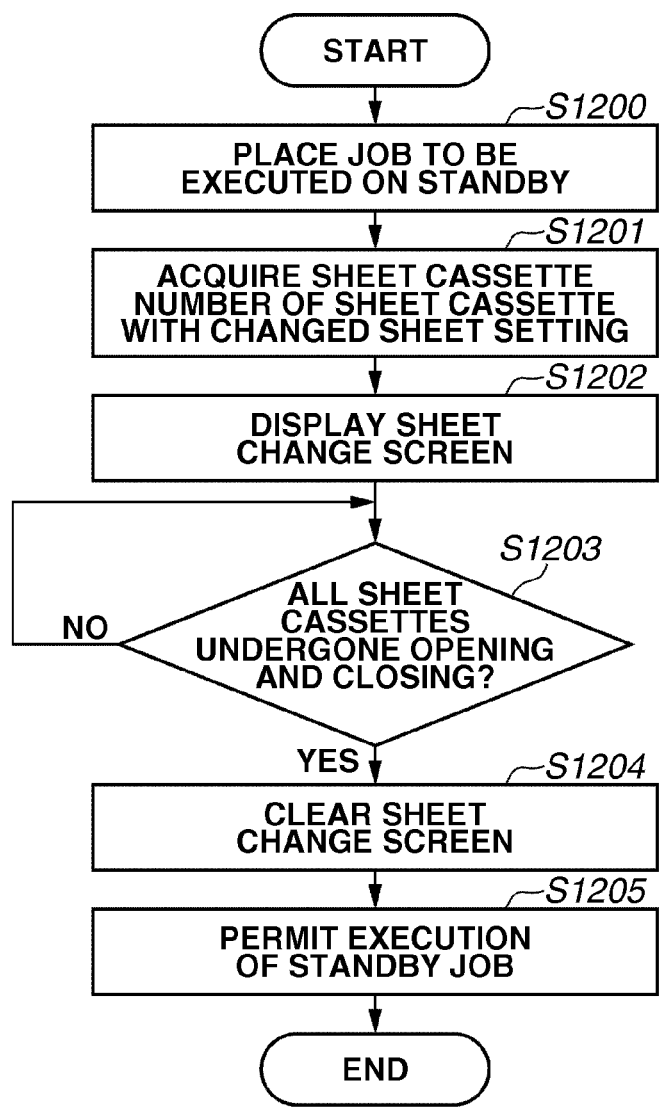
FIG. 13 is a flowchart illustrating a control method for the printing system.

FIG. 13 is a flowchart illustrating a control method for the printing system according to the present exemplary embodiment. This example method corresponds to the processing for causing grouping to function effectively in the printing system. Each step is performed by the CPU 201 executing a control program loaded to the memory 202. This example processing is performed subsequent to step S1008 illustrated in FIG. 11. The following description is an example case where the CPU 201 displays a message on the operation unit 303 while placing an input of a job to be executed on standby after the information of the sheet of the sheet cassette is changed, the message requesting a replacement of sheets on the sheet cassette of which sheet information is changed.

In step S1200, the CPU 201 places a print job to be executed on standby. In step S1201, the CPU 201 acquires a sheet cassette number of the sheet cassette in which sheet setting is updated. Subsequently, in step S1201, the CPU 201 displays a UI screen illustrated in FIG. 14 on the operation unit 303, the UI screen facilitating a change of sheets. Herein, the CPU 201 also displays the sheet cassette number acquired in step S1201.

Subsequently, in step S1203, the CPU 201 determines whether operation of opening and closing a door of the sheet cassette corresponding to the acquired sheet cassette number is executed by a user. Herein, the CPU 201 determines the opening and closing from an output state of a sensor (not illustrated) for detecting a door opening and closing state. The output state of the sensor for detecting the door opening and closing state is determined, so that the CPU 201 can determine whether the sheet of the sheet storing unit with the changed sheet information has undergone a sheet replacement operation.

Figure 14:
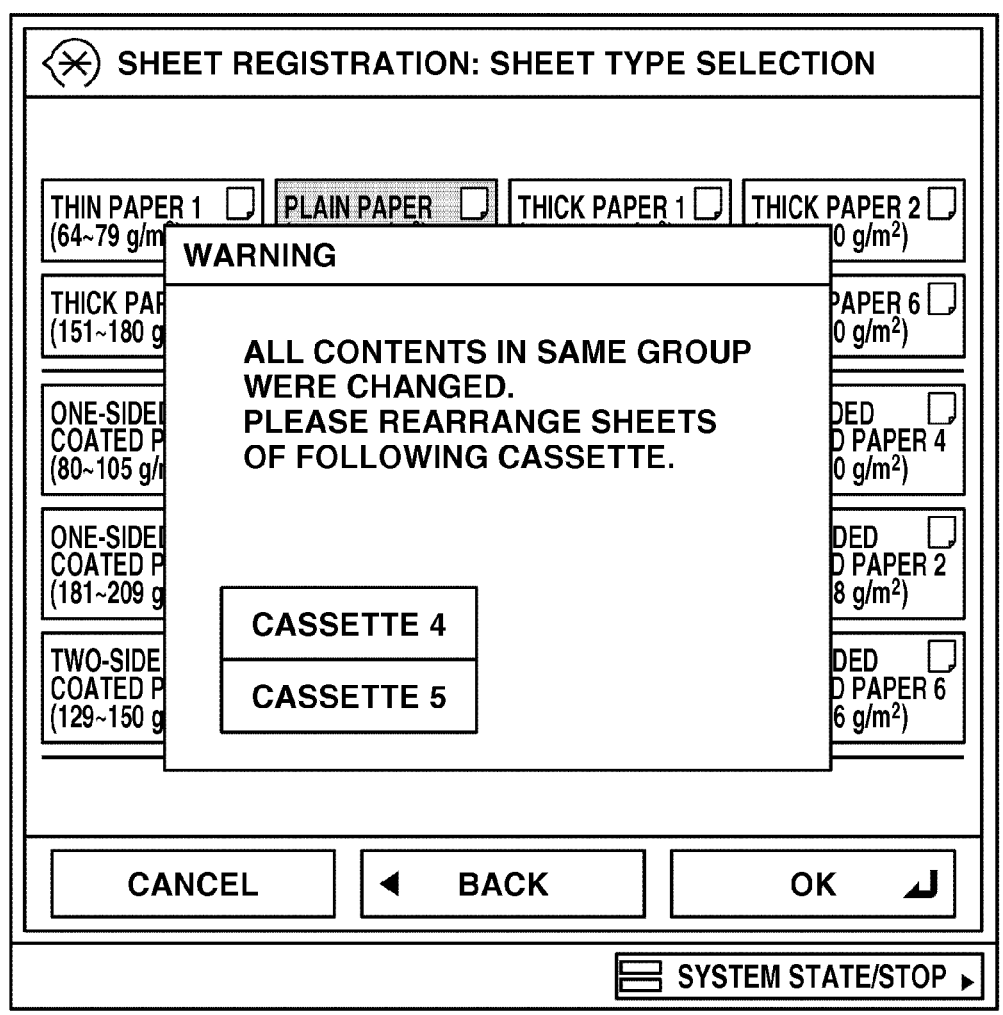
FIG. 14 is a diagram illustrating one example of a UI screen displayed on the liquid crystal display unit illustrated in FIG. 4.

If the door opening and closing of the sheet cassette by the user is detected with respect to all the displayed sheet cassettes (YES in step S1203), then in step S1204, the CPU 201 clears the UI screen illustrated in FIG. 14. In step S1205, the CPU 201 releases the job input restriction to permit execution of the print job on standby, and the processing ends. The UI screen illustrated in FIG. 14 can display size of a sheet and type of a sheet, which should be stored in a sheet cassette, along with the sheet cassette information instead of displaying the sheet cassette information only.

Therefore, an appropriate message is displayed on the operation unit 303 to facilitate a user to replace sheets, thereby reducing cases where the user updates only setting information and forgets replacement of the sheets. Consequently, the sheet replacement to be executed in association with a change in setting of the grouped sheet cassette cannot be forgotten, thereby reducing the possibility of selecting unintended sheets when a sheet setting is changed.

Another exemplary embodiment will be described. In the above exemplary embodiment, when a sheet storing unit to be used is changed as described in step S905 (see FIG. 10), size and type of the sheet set in the sheet storing unit are considered. However, the present exemplary embodiment can be applied to a printing system permitting a change of a sheet storing unit to be used without consideration of size and type of a sheet on condition of the same group name. Even in such a case, when a setting of a grouped sheet storing unit is changed, and the changed setting of the sheet storing unit is not consistent with the other sheet storing units belonging to the same group as that sheet storing unit, a control for notifying a user of such a matter can be applied. Therefore, the present exemplary embodiment can prevent cases where a print product with mixture of user unintended size or type of sheets is output due to a switch of the sheet storing units within the same group.

Other Embodiments

Aspects of the claimed invention can also be realized by a computer of a system or apparatus (or devices such as a CPU, a micro processing unit (MPU), and/or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium). In such a case, the system or apparatus, and the recording medium where the program is stored, are included as being within the scope of the claimed invention.

While the claimed invention has been described with reference to exemplary embodiments, it is to be understood that the claimed invention is not limited to the disclosed exemplary embodiments. The scope of the following claims is to be accorded the broadest interpretation so as to encompass all modifications, equivalent structures, and functions.

This application claims priority from Japanese Patent Application No. 2011-259224 filed Nov. 28, 2011, which is hereby incorporated by reference herein in its entirety.

What is claimed is:

1. A printing apparatus having a plurality of sheet holding units, comprising:
    a conveying unit configured to convey sheets held in the plurality of sheet holding units;
    a printing unit configured to print images on the sheets conveyed by the conveying unit;
    a storing unit configured to store a sheet attribute, set for each of the plurality of sheet holding units;
    a setting unit configured to set more than one sheet holding unit as a group; and
    a changing unit configured to specify, when it is instructed to change a sheet attribute of a first sheet holding unit, a second sheet holding unit which belongs to a same group as the first sheet holding unit, and to change a sheet attribute of the specified second sheet holding unit, which is not equal to the changed sheet attribute of the first sheet holding unit, to a same sheet attribute as the changed sheet attribute of the first sheet holding unit, while maintaining a group to which the first sheet holding unit and the second sheet holding unit belong.

2. A printing apparatus according to claim 1, further comprising a determination unit configured to determine whether the sheet attribute of the specified second sheet holding unit is equal to the changed sheet attribute of the first sheet holding unit,
    wherein the changing unit is configured to change the sheet attribute of the second sheet holding unit in a case where it is determined that the sheet attribute of the specified second sheet holding unit is not equal to the changed sheet attribute of the first sheet holding unit.

3. A printing apparatus according to claim 2, further comprising a display unit configured to display a screen for receiving an instruction of whether or not to change the second sheet holding unit in a case where it is determined that the sheet attribute of the specified second sheet holding unit is not equal to the changed sheet attribute of the first sheet holding unit.

4. A printing apparatus according to claim 3, wherein the display unit is configured not to display the screen in a case where it is determined that the sheet attribute of the specified second sheet holding unit is equal to the changed sheet attribute of the first sheet holding unit.

5. A printing apparatus according to claim 1, further comprising a control unit configured to, when lack of sheets occurs while a printing using sheets conveyed from the first sheet holding unit is being performed, specify the second sheet holding unit which belongs to the same group as the first sheet holding unit, and to control the conveying unit to convey sheets from the second sheet holding unit.

6. A printing apparatus according to claim 1, wherein the setting unit is configured to, for each sheet holding unit, set whether a sheet holding unit should belong to a group or not and set which group to which the sheet holding unit should belong.

7. A control method for controlling a printing apparatus having a plurality of sheet holding units, the control method comprising:
    conveying sheets held in the plurality of sheet holding units;
    printing images on the conveyed sheets;
    storing a sheet attribute set for each of the plurality of sheet holding units;
    setting more than one sheet holding unit as a group; and
    specifying, when it is instructed to change a sheet attribute of a first sheet holding unit, a second sheet holding unit which belongs to a same group as the first sheet holding unit, and changing a sheet attribute of the specified second sheet holding unit, which is not equal to the changed sheet attribute of the first sheet holding unit, to a same sheet attribute as the changed sheet attribute of the first sheet holding unit, while maintaining a group to which the first sheet holding unit and the second sheet holding unit belong.

8. A non-transitory computer readable storage medium for storing a computer program for controlling a printing apparatus having a plurality of sheet holding units, the computer program comprising:
    a code to convey sheets held in the plurality of sheet holding units;
    a code to print images on the conveyed sheets;
    a code to store a sheet attribute set for each of the plurality of sheet holding units;
    a code to set more than one sheet holding unit as a group; and
    a code to specify, when it is instructed to change a sheet attribute set to a first sheet holding unit, a second sheet holding unit which belongs to a same group as the first sheet holding unit, and to change a sheet attribute of the specified second sheet holding unit, which is not equal to the changed sheet attribute of the first sheet holding unit, to a same sheet attribute as the changed sheet attribute of the first sheet holding unit, while maintaining a group to which the first sheet holding unit and the second sheet holding unit belong.

* * * * *